(12) United States Patent
Vitali et al.

(10) Patent No.: US 9,556,919 B2
(45) Date of Patent: Jan. 31, 2017

(54) SAFETY DEVICE FOR A CABLE STRETCHING MACHINE, CORRESPONDING METHOD AND STRETCHING MACHINE USING SAID DEVICE

(71) Applicant: TESMEC SPA, Milan (IT)

(72) Inventors: Maurizio Vitali, Bergamo (IT); Alberto Oscar, Castro (IT)

(73) Assignee: TESMEC SPA, Milan (IT)

( * ) Notice: Subject to any disclaimer, the term of this patent is extended or adjusted under 35 U.S.C. 154(b) by 0 days.

(21) Appl. No.: 14/650,065

(22) PCT Filed: Dec. 4, 2013

(86) PCT No.: PCT/IB2013/002695
§ 371 (c)(1),
(2) Date: Jun. 5, 2015

(87) PCT Pub. No.: WO2014/087222
PCT Pub. Date: Jun. 12, 2014

(65) Prior Publication Data
US 2015/0300429 A1    Oct. 22, 2015

(30) Foreign Application Priority Data
Dec. 5, 2012 (IT) .............................. MI2012A2081

(51) Int. Cl.
*B66D 1/08* (2006.01)
*F16D 59/00* (2006.01)
(Continued)

(52) U.S. Cl.
CPC ................ *F16D 59/00* (2013.01); *B60M 1/28* (2013.01); *F16D 65/28* (2013.01); *H02G 1/04* (2013.01)

(58) Field of Classification Search
CPC ................ B66D 1/44; B66D 1/26; B66B 9/00
(Continued)

(56) References Cited

U.S. PATENT DOCUMENTS 4,447,044 A * 5/1984 Nakata .................... B66D 1/44
                                                        192/17 A
5,007,599 A * 4/1991 Forsyth .............. B65H 75/4489
                                                       191/12.2 A
(Continued)

FOREIGN PATENT DOCUMENTS

CN     201156651     11/2008
CN     201801263      4/2011
(Continued)

OTHER PUBLICATIONS

International Search Report and Written Opinion issued in the corresponding International PCT Application No. PCT/IB2013/002695, dated Jul. 22, 2014, 8 pages.

*Primary Examiner* — Christopher Schwartz
(74) *Attorney, Agent, or Firm* — Hamre, Schumann, Mueller & Larson, P.C.

(57) ABSTRACT

Safety device for a stretching machine of the brake type comprising a negative brake which can be selectively activated and de-activated so as to constrain and respectively allow the rotation of at least one capstan which supports cables, a pumping device connected to the negative brake and configured to de-activate the latter during the normal use of the stretching machine, putting a working fluid under pressure, pressure energy accumulation means of said working fluid, and a maximum pressure valve configured to regulate the working pressure of a hydraulic motor for controlling the twisting torque applied to the capstan. The device also comprises a motorized drive device connected to the maximum pressure valve and provided to selectively regulate the action of the latter on the hydraulic motor, even (Continued)

in a breakdown condition of at least the pumping device, in order to maintain the working pressure of the hydraulic motor and to maintain the negative brake de-activated by the intervention of the pressure energy accumulation means.

15 Claims, 3 Drawing Sheets

(51) Int. Cl.
*B60M 1/28* (2006.01)
*H02G 1/04* (2006.01)
*F16D 65/28* (2006.01)

(58) Field of Classification Search
USPC ......... 188/2 D, 82.9, 84; 254/275, 323, 360, 254/361, 377
See application file for complete search history.

(56) References Cited

U.S. PATENT DOCUMENTS

| 5,533,711 | A | * | 7/1996 | Pickrell | B65H 51/30 242/396.9 |
| 5,833,016 | A | * | 11/1998 | Carpenter | B66B 9/00 166/77.51 |
| 6,012,707 | A | * | 1/2000 | Enlund | B66D 1/44 254/323 |
| 7,896,315 | B2 | * | 3/2011 | Faust | B66D 1/26 254/275 |
| 2005/0045861 | A1 | * | 3/2005 | Roodenburg | A63G 7/00 254/360 |

FOREIGN PATENT DOCUMENTS

| EP | 1256482 | 11/2002 |
| JP | 03155314 | 7/1991 |
| JP | 0937424 | 2/1997 |

* cited by examiner

SAFETY DEVICE FOR A CABLE STRETCHING MACHINE, CORRESPONDING METHOD AND STRETCHING MACHINE USING SAID DEVICE

FIELD OF THE INVENTION

The present invention concerns a safety device for a cable stretching machine.

In particular, the safety device consists of a hydraulic circuit, preferably but not exclusively applied to a stretching machine of the brake type suitable to apply a controlled tension on the conductors in the stretching step. The safety device, according to the invention, intervenes in the event of failure of parts of the device or in emergency conditions.

The present invention also concerns the corresponding method for the safety control of a cable stretching machine, and the stretching machine in which said safety device is used.

BACKGROUND OF THE INVENTION

Stretching machines are known, for example for stretching a high voltage electric line, a railway line or other, in general aerial lines, which provide the so-called "braked" stretching of cables by means of multiple capstan machines from which the cables to be stretched or respectively to be recovered, are unwound, or onto which they are respectively wound.

In particular, said stretching devices provide a machine with a winch function configured to recover a cable, or a steel-wire rope, with a drawing function, by winding the latter on a respective pair of collection capstans. Such stretching devices, on the other side of the line to be stretched, comprise a machine with the function of a brake, configured to control the unwinding tension of the cable or cables to be stretched, by winding the cable on the respective pair of unwinding capstans where the cable is put under tension, for example, by the action of the winch machine. In particular, the brake machine exerts a controlled tension on the cables in the stretching step in order to guarantee they can remain suspended to suitable guide devices provided on intermediate supports, and that they are disposed according to the configuration of the suspended catenary wire with controlled inflection. In this way the cables do not slide on the ground and remain distant from possible obstacles present under the cables, such as for example road or railway crossings, intersections with other electric lines etc.

It is also known to use aerial means, such as for example a helicopter, to draw a so-called pilot cable from the brake machine to the winch machine, or, sometimes, to draw the final conductor directly from the brake machine to the destination zone without using the winch machine.

The stretching device, also known as braked stretching device, can also be applied for stretching an electric catenary wire for railway traction. In this case, the brake machine is mounted on a traveling wagon, whether it is self-propelled or drawn and, thanks to the movement of the wagon, the cable is released with a controlled tension through the action of the brake.

It is also known to equip traditional brake machines with a mechanical safety device with automatic drive, also known as negative brake, the purpose of which is to hold the conductor under tension both when the machine is stopped, that is, when the safety device is not powered, and also in emergency situations, for example due to a breakdown in the actuation device.

The negative brake is normally associated with one or more distributor valves that control the activation thereof.

There are also solutions in the state of the art in which the brake machine is provided with a maximum pressure valve, commanded electrically, that is, with a proportional electrical command, which allows to selectively and precisely regulate the working pressure in the device, and consequently the final tension in the stretching cable.

However, when there is a break-down in the electrical drive, the maximum pressure valve is no longer able to control the working pressure in the device, and dangerous conditions may arise.

In particular, if the electrical drive signal to the maximum pressure valve fails, the valve opens completely, discharging the whole circuit controlled, and since the negative brake is de-activated, a loss of tension occurs in the cable, with the consequent and connected risks.

Furthermore, if the distributor valve that powers the negative brake is the unstable type, also known as monostable, that is, the type that when the activation command ceases returns autonomously to its initial functioning condition, this closes the negative brake and returns it to the blocked condition. The blockage of the negative brake entails a recoil on the cable under tension and/or on the mean that is drawing the cable.

Known winch machines for braked stretching are normally equipped with devices to limit and control the overload which, if used correctly, prevent overload situations along the path of the cables stretched.

When stretching is performed with a mean other than winch machines, and in order to carry out the traction and/or translation operation, as in the case of the railway wagon or the helicopter, the sudden stopping of the brake machine, for example due to extraordinary reasons, causes a recoil on the traveling mean.

When the brake machine suddenly stops, the automatic-drive safety device or negative brake intervenes to maintain tension on the cables. However, the action of retaining the tension is not coordinated with the stopping of the traveling mean.

Consequently, there is an overload on the cable, and possibly damage or breakage thereof, with obvious risks and problems of safety for the operators, in particular those on board the aerial or railway mean, and also for everything that is connected to or is under the cable: this in practice frustrates the safety function of the negative brake. It is particularly important to prevent these problems if a helicopter is used for stretching, where a recoil can lead to instability and a loss of control of the aircraft, with obvious consequences.

It is also known, in some more evolved solutions, to connect means to accumulate pressure energy of the working fluid, such as for example a hydraulic accumulator, to the negative brake.

Normally, in this case, the hydraulic circuit provides flow distributor valves, or valves to regulate the flow, of the negative brake, which determine the flow of the working fluid from the pressure energy accumulation means and from a pumping device toward the negative brake.

The distributor valves can be the type with a maintained action, or bistable, or the type with a non-maintained action, or monostable.

If there is a break-down of the device, and if the distributor valves are the maintained action type, a loss of tension occurs in the cable, since the pressure of the working fluid in the circuit is drastically reduced, whereas if the distributor valves are the non-maintained action type, there is a sudden stoppage of the negative brake with a consequent recoil effect.

In particular, when there is a failure of electrical or hydraulic parts of the stretching machine, and if the distributor valves are the non-maintained action type, the pressure of the working fluid generated by the pressure energy accumulation means is able to prevent a sudden blockage of the rotation of the capstan, with consequent elimination of the negative recoils but the maximum pressure valve, opening, would in any case cause loss of tension in the cable.

CN201.156.651Y discloses the features of the preamble of the main claims.

One purpose of the present invention is therefore to obtain a safety device for a stretching machine that prevents the occurrence of dangerous conditions during the stretching of cables when a breakdown occurs in the braking machine.

Another purpose of the present invention is to obtain a safety device for a stretching machine that allows to complete the stretching operations without generating overload situations, or instability of the device, substantially maintaining the functioning values set before the occurrence of the breakdown.

Another purpose is to perfect a control method of a cable stretching machine which allows to perform the stretching operations safely, even when parts of the device have failed.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a safety device for a stretching machine of the brake type comprises a negative brake which can be selectively activated and de-activated so as to constrain and respectively allow the rotation of at least one capstan, preferably a pair of capstans, which support the cables. The device also comprises a pumping device connected to the negative brake and configured to de-activate the latter during the normal use of the stretching machine, putting a working fluid under pressure. In particular, the action of the working fluid under pressure de-activates the negative brake and allows to keep the capstan or pair of capstans in rotation.

The device also comprises means to accumulate pressure energy of the working fluid, such as for example a hydraulic accumulator, which can be selectively connected to the negative brake. In this way, even if the electric or hydraulic parts of the stretching machine fail, the pressure of the working fluid generated by the accumulator prevents a sudden blockage of the rotation of the capstan, or the pair of capstans, thus preventing recoils which could damage both the negative brake and the cable being stretched, as well as the drawing means. Moreover, so as to prevent a loss of tension in the cable which is being stretched, the device comprises a maximum pressure valve which is configured to regulate the working pressure of a hydraulic motor which controls the movement of the capstan, or pair of capstans, which in reality works as a hydraulic pump, being drawn by the capstan, or the pair of capstans, in its turn drawn by the cable connected to the drawing mean.

According to one feature of the present invention, the device comprises a motorized drive device connected to the maximum pressure valve and provided to regulate the action of the latter on the hydraulic motor, even in possible breakdown conditions of the machine. In this way the maximum pressure valve allows to complete the stretching operations of the cable, even in conditions of electric or hydraulic breakdown, preventing both a loss of tension of the cable or cables being stretched, and problems of recoils due to a sudden intervention of the negative brake.

In one form of embodiment, the device comprises a first distributor valve configured to regulate the flow of the working fluid between the pumping device and the negative brake, and a second distributor valve configured to regulate the flow of the working fluid between the pressure energy accumulation means and the negative brake. In particular, in normal working conditions, the first distributor valve allows the direct connection of the pumping device toward the negative brake and toward the energy accumulation means, sending the working fluid to both under pressure.

If a breakdown occurs, the working fluid under pressure is guaranteed by the presence of pressure energy accumulation means.

In one form of embodiment, first distributor valve and second distributor valve are the commanded and bistable type. In particular, under normal working conditions, the switching of the valves is determined by command means, for example controlled by a controller. If a breakdown occurs, even in the condition where the command action of the distributor valves ceases, the latter stay in the same working position as they already are, given that they are the bistable type.

Other forms of embodiment provide that between the pumping device and the first distributor valve a first non-return valve is interposed, configured to prevent the working fluid from flowing back toward the pumping device, due to a pressure condition of the working fluid generated by the pressure energy accumulation means.

Some forms of embodiment of the present invention provide that the device also comprises a controller to control at least the intervention modes of the motorized drive device on the maximum pressure valve, and possibly to control the switching of the distributor valves.

The present invention also concerns a control method for a safety device for a stretching machine of the brake type which provides at least a first step of stopping the machine in which at least one capstan, preferably a pair of capstans, is kept blocked in its rotation by the action of a negative brake, and a second working step during which a pumping device connected to the negative brake puts a working fluid under pressure in order to de-activate the negative brake and allow the capstan or pair of capstans to rotate. Moreover, during the second step, a maximum pressure valve regulates a working pressure of a hydraulic motor to control the twisting torque applied to the capstan or to the pair of capstans.

According to one feature of the present invention, during the second working step, and when at least the pumping device is in a breakdown condition, it is provided to keep the negative brake de-activated by the action of a pressure of the working fluid. Moreover, in said breakdown condition, a motorized drive device connected to the maximum pressure valve controls the working pressure of the hydraulic motor which determines the controlled rotation of the capstan or the pair of capstans. The invention also concerns a stretching machine in which the safety device described above is adopted.

BRIEF DESCRIPTION OF THE DRAWINGS

These and other characteristics of the present invention will become apparent from the following description of one form of embodiment, given as a non-restrictive example with reference to the attached drawings wherein.

To facilitate comprehension, the same reference numbers have been used, where possible, to identify identical common elements in the drawings.

DETAILED DESCRIPTION OF ONE FORM OF EMBODIMENT

Figure 1:
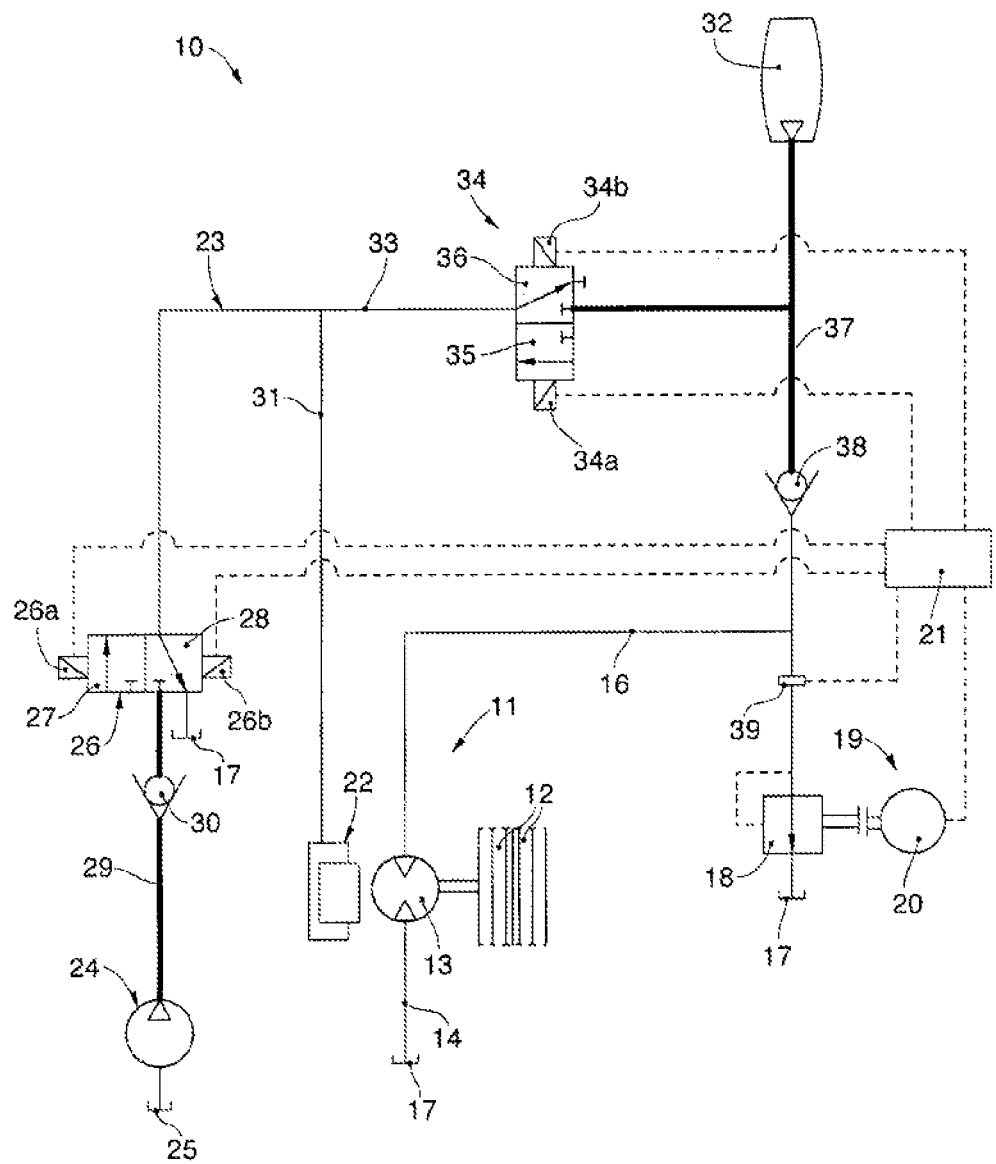
FIG. 1 is a schematic representation of a safety device for a cable stretching machine, in a first operating condition.

The present invention concerns a safety device 10 (FIG. 1) for a stretching machine 11 for cables wound on respective capstans, in this case a pair of capstans 12.

The stretching machine 11 is the type that has a braking function and is configured to control the tension with which the cables are unwound from the pair of capstans 12.

The stretching machine 11 comprises at least a hydraulic motor 13 configured to be drawn in rotation by the pair of capstans 12, thus operating as a hydraulic pump to keep the cables under tension during normal stretching operations.

The hydraulic motor 13 is connected to a hydraulic circuit which comprises a suction branch 14 through which a working fluid is sucked in from a tank 17, and a delivery branch 16 or pipe, connected to a maximum pressure valve 18. The maximum pressure valve 18 is configured to maintain a substantially constant pressure in the delivery branch 16 and consequently in the hydraulic motor 13, even as the functioning conditions of the hydraulic motor 13 vary.

The working fluid 13, once it has passed through the maximum pressure valve 18, is discharged into the tank 17.

A motorized drive device 19 is connected to the maximum pressure valve 18 and is configured to vary the work configuration of the maximum pressure valve 18 in order to regulate the work pressure of the hydraulic motor 13.

The motorized drive device 19 is governed by a controller 21 to control the intervention modes of the latter on the maximum pressure valve 18. In particular, once a working pressure value of the maximum pressure valve 18 has been set, the controller 21 acts on the motorized drive device 19 so that it regulates the maximum pressure valve 18 as a consequence.

The work pressure can be set directly by the operator during the stretching steps by acting on the controller 21, or the latter commands the motorized drive device 19 so that it generates a pressure needed to obtain the drawing value set by the operator.

In other forms of embodiment, the working pressure of the hydraulic motor 13 can be a value self-learnt by the controller 21, for example, by inserting pressure detectors 39 into the delivery branch 16, as shown in FIG. 1.

In the form of embodiment in FIG. 1, the motorized drive device 19 comprises an electric motor 20, the controlled rotation of which determines a regulation of the maximum pressure valve 18.

The electric motor 20 can advantageously but not necessarily be a stepper motor, to allow a precise and accurate regulation.

In other forms of embodiment, the motorized drive device 19 can be a hydraulic or pneumatic actuator, electric drive like a motor or an actuator.

The stretching machine 11 also comprises a brake 22, also called negative brake, able to be hydraulically driven, which allows to block the rotation of the pair of capstans 12.

The brake 22 is connected to a hydraulic command circuit 23 which comprises at least one pumping device or pump 24, to put under pressure a working fluid such as oil, toward the brake 22.

The brake 22 is able to be selectively activated and de-activated by the hydraulic command circuit 23, to allow a blocked condition and respectively a free rotation of the pair of capstans 12. In particular, when the working fluid is put under pressure in the hydraulic command circuit 23, the brake 22 is de-activated, the commanded rotation of the pair of capstans 12 is allowed and the hydraulic motor 13 is drawn. When the pressure action of the working fluid ceases, the brake 22 is activated, constraining the rotation of the pair of capstans 12.

A tank 25 is connected to the pump 24, from which tank 25 the pump 24 takes the working fluid to send it to the brake 22.

The pump 24 is connected to the brake 22 by connection pipes. The transfer of the working fluid from the pump 24 to the brake 22 is controlled by a first distributor valve 26.

In the form of embodiment in FIG. 1, the first distributor valve 26 is the commanded 3/2 bistable type. By bistable distributor valve we mean that, when the command action that has determined the switching of the valve stops, the valve remains in the position where it is.

The first distributor valve 26 comprises a first command portion 26a and a second command portion 26b, each of which is able to be selectively actuated to determine the switching of the first distributor valve 26.

In the form of embodiment in FIG. 1, the first 26a and the second command portion 26b are the electrically driven type. Other forms of embodiment can provide a pneumatic, oil-dynamic, electro-mechanical, electro-pneumatic or manual drive.

Activating the first command portion 26a determines the switching of the first distributor valve 26 to a first working position 27 in which the working fluid, pumped by the pump 24, passes through the first distributor valve 26 and feeds the brake 22.

Activating the second command portion 26b determines the switching of the first distributor valve 26 to a second working position 28 in which the working fluid, pumped by the pump 24, is intercepted by the first distributor valve 26 and the delivery of the latter is set to discharge; this determines the consequent activation of the brake 22 which blocks the rotation of the pair of capstans 12.

The first distributor valve 26 is connected to the pump 24 by means of a delivery pipe 29.

A first interception valve 30, or non-return valve, is interposed in the delivery pipe 29 and prevents the working fluid from flowing back from the first distributor valve 26 to the pump 24.

A pipe 31 reciprocally connects the first distributor valve 26 with the brake 22.

Pressure energy accumulation means, in this case a hydraulic accumulator 32, are in turn connected to the brake 22 by means of a first pipe 33. In the form of embodiment in FIG. 1, the first pipe 33 is connected to the pipe 31.

The accumulator 32 can be the gas type with a mobile piston, membrane, spring, weight, sac or other type.

Between the accumulator 32 and the brake 22, a second distributor valve 34 is connected to the first pipe 33.

Identically to the first distributor valve 26, the second distributor valve 34 also comprises a first command portion 34*a* and a second command portion 34*b*, each of which is able to be selectively actuated to determine the switching of the second distributor valve 34.

Some forms of embodiment provide that the first 34*a* and the second command portion 34*b* are the type described above with reference to the first 26*a* and second command portion 26*b* of the first distributor valve 26.

Activating the first command portion 34*a* switches the second distributor valve 34 to a first work position 35 in which the accumulator 32 transfers working fluid to the brake 22. Activating the second command portion 34*b* switches the second distributor valve 34 to a second work position 36 in which the working fluid of the accumulator 32 is intercepted and the pressure energy is preserved inside the accumulator.

The hydraulic motor 13 is connected to the accumulator 32 by means of a second pipe 37.

In particular, in the form of embodiment in FIG. 1, the second pipe 37 is connected to the delivery branch 16 of the hydraulic motor 13.

A second interception valve 38, or non-return valve, is connected to the second pipe 37, and prevents the working fluid from flowing back from the accumulator 32 to the hydraulic motor 13.

The controller 21 is also configured to command the first 26 and second distributor valve 34 and in particular the respective first 26*a*, 34*a* and second command portions 26*b* and 34*b*.

The safety device functions as follows.

Figure 2:
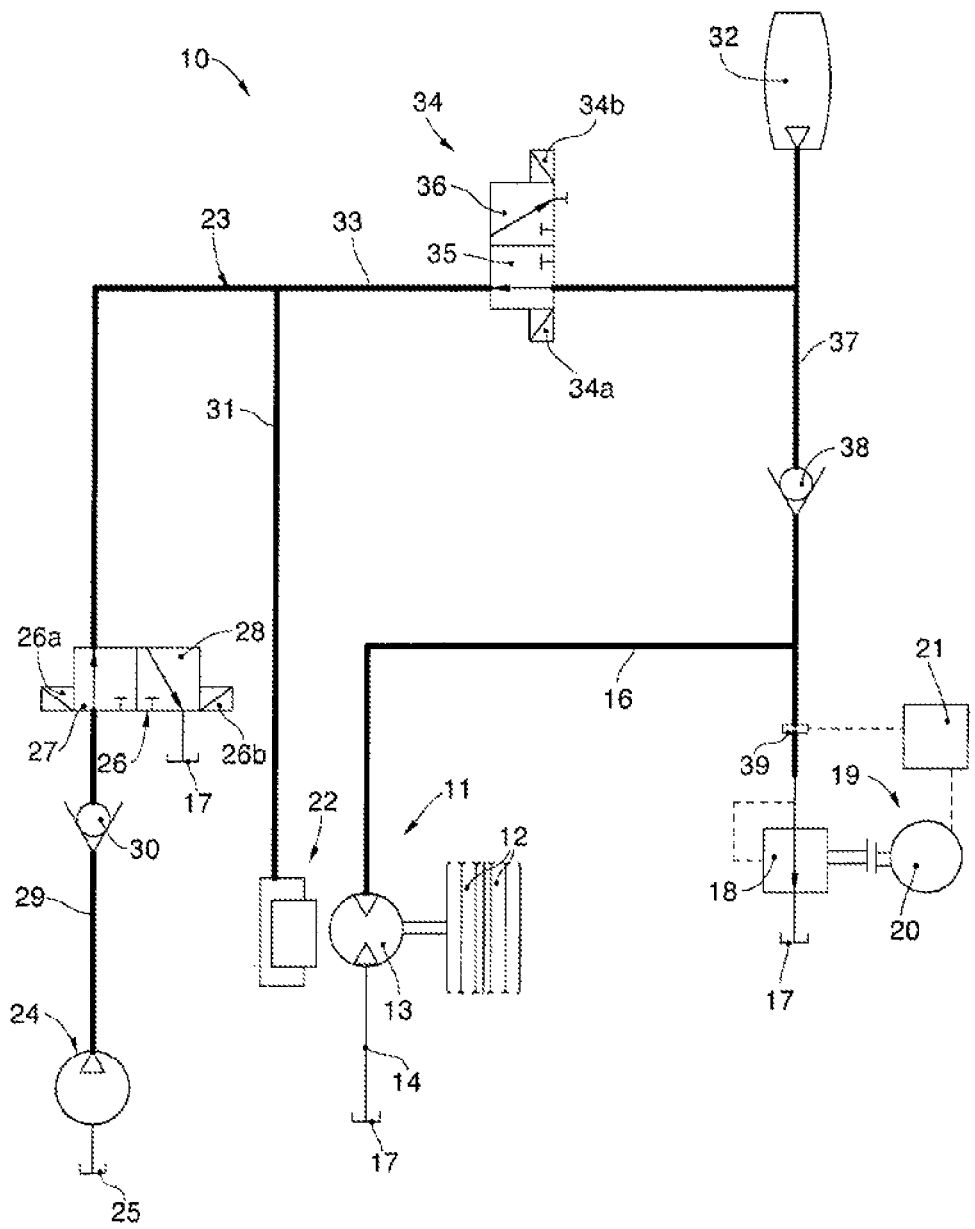
FIG. 2 is a schematic representation of the device in FIG. 1, in a second operating condition.
Figure 3:
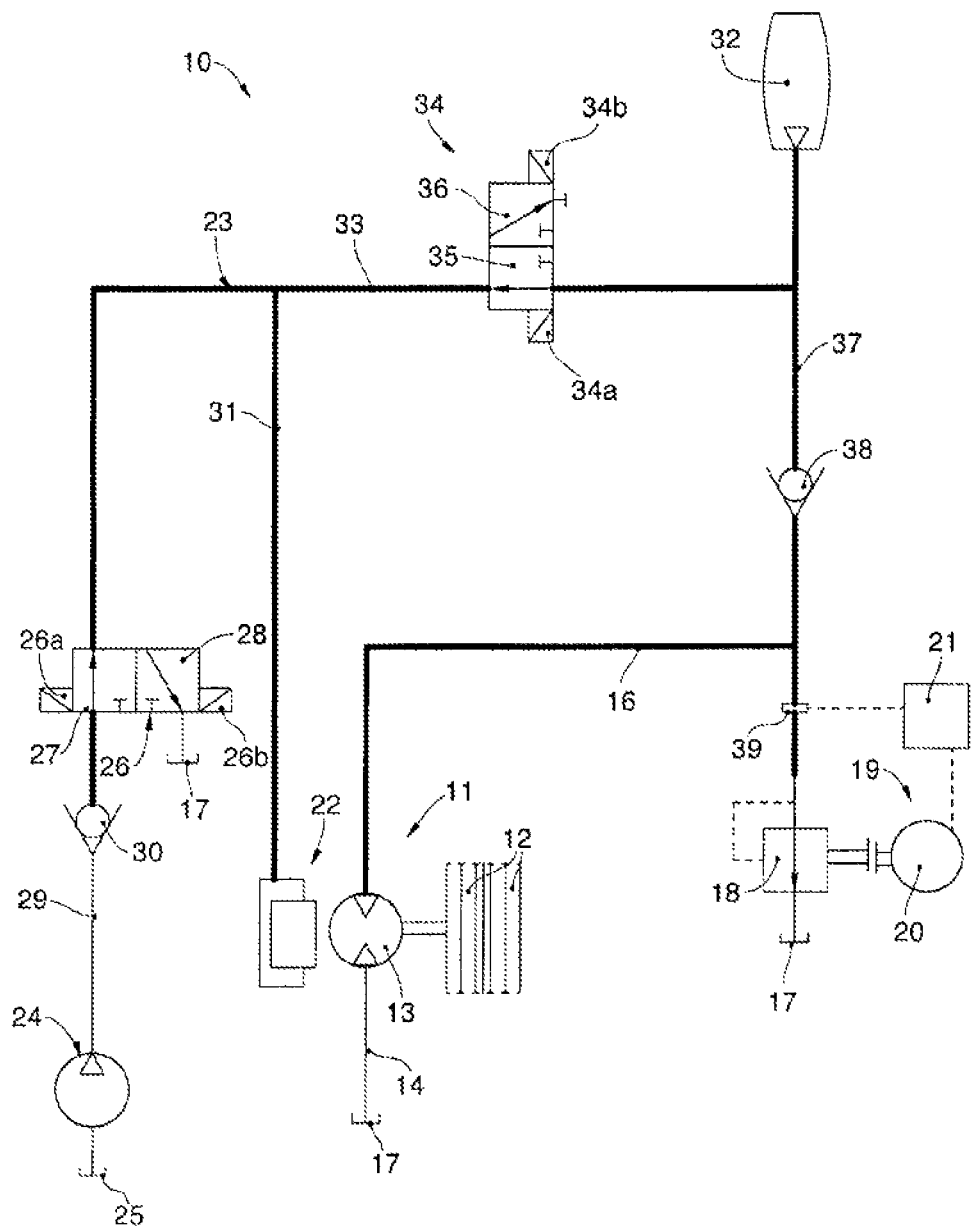
FIG. 3 is a schematic representation of the device in FIG. 1, in a third operating condition.

With reference to FIGS. 1, 2 and 3, the connections between the components of the device are shown by a thin line and a thick line, to identify respectively parts not under pressure and parts under pressure of the circuit.

With reference to FIG. 1, a start-up condition of the device 10 is shown, in which the pump 24 puts the working fluid in the delivery pipe 29 under pressure.

When the device 10 is started (FIG. 1), the first distributor valve 26 and the second distributor valve 34 are in their respective second work positions 28 and 36.

In particular, the working fluid under pressure in the delivery pipe 29 is intercepted by the first distributor valve 26, while the working fluid of the accumulator 32, possibly under pressure if there is any residual pressure in the accumulator 32, is intercepted by the second distributor valve 34, which prevents the de-activation of the brake 22.

The brake 22 is therefore activated by constraining, or impeding, the rotation of the pair of capstans 12.

Subsequently, the work step is started (FIG. 2), in which the first 26 and second distributor valve 34 are switched.

In particular, the controller 21 activates the first command portions 26*a* and 34*a* of the first 26 and second distributor valve 34, so that they move to their first work position respectively 27 and 35.

In this condition, the pump 24 puts the hydraulic command circuit 23 under pressure, determining the de-activation of the brake 22. The stretching machine 11 is therefore able to be activated to determine the stretching of the cables.

Switching the second distributor valve 34 into the first work position 35 puts the accumulator 32 into fluidic communication with the pump 24 and the brake 22. The pump 24 also provides to fill the accumulator 32 for an accumulation of pressure energy if the accumulator 32 has zero residual pressure or lower than that generated by the pump 24.

The pair of capstans 12 draws the hydraulic motor 13. The hydraulic motor 13 in turn generates a flow of working fluid both toward the accumulator 32 and the brake 22, and also toward the maximum pressure valve 18.

The maximum pressure valve 18 generates and regulates the work pressure of the hydraulic motor 13, thus determining the control of the twisting torque of the pair of capstans 12, and consequently the tension applied to the cables wound on the pair of capstans 12.

If there is a breakdown (FIG. 3), for example of the propulsion system or the hydraulic device, which causes a lack of fluid under pressure, or of the electrical device, such as a failure of electrical power to the machine, the first distributor valve 26 and the second distributor valve 34 maintain their respective first work position 27, 35, given that they are the bistable type. The first interception valve 30 and the second interception valve 38 prevent the working fluid under pressure from flowing back to the pump 24 and, respectively, from the accumulator 32 to the hydraulic motor 13.

The maximum pressure valve 18, regulated by the electric motor 20, maintains its regulation position to control at the same time the tensioning of the cables. The condition of regulation maintained by the maximum pressure valve 18 is advantageously the one set by the electric motor 20 before the occurrence of the break-down condition.

The accumulator 32 keeps the pipe 31 under pressure and consequently the brake 22 de-activated.

The brake 22 does not constrain the rotation of the hydraulic motor 13, which continues to regulate, with the aid of the maximum pressure valve 18, the rotation of the pair of capstans 12, and also sends working fluid under pressure to the brake 22 and maintains the accumulator 32 charged. In this way, even in conditions of electrical and/or hydraulic failure, the risk of a recoil is avoided, due to the prompt intervention of the brake 22, and the risk of loss of tension in the cable of the pair of capstans 12 is avoided, as happens in the solutions described in the state of the art.

It is clear that modifications and/or additions of parts may be made to the safety device 10 and method as described heretofore, without departing from the field and scope of the present invention.

It is also clear that, although the present invention has been described with reference to some specific examples, a person of skill in the art shall certainly be able to achieve many other equivalent forms of safety devices 10, and method for controlling a stretching machine, having the characteristics as set forth in the claims and hence all coming within the field of protection defined thereby.

The invention claimed is:

1. A safety device for a stretching machine, comprising: a negative brake selectively activated and de-activated so as to constrain and respectively allow the rotation of at least one capstan which supports cables, a pumping device connected to the negative brake and configured to de-activate the negative brake during the normal use of the stretching machine, putting a working fluid under pressure, pressure energy accumulation means of said working fluid, and a maximum pressure valve configured to regulate the working pressure of a hydraulic motor for controlling the twisting torque applied to the capstan, wherein said safety device further comprises a motorized drive device connected to the maximum pressure valve and provided to selectively regulate the action of the maximum pressure valve on the hydraulic motor, even in a breakdown condition of at least said pumping device, in order to maintain said working pressure of the hydraulic motor and to maintain said negative brake de-activated by the intervention of said pressure energy accumulation means.

2. The device as in claim 1, further comprising a first distributor valve configured to regulate the flow of said working fluid between the pumping device and the negative brake, and a second distributor valve configured to regulate the flow of said working fluid between the pressure energy accumulation means and the negative brake.

3. The device as in claim 2, wherein said first distributor valve and said second distributor valve are commanded and bistable.

4. The device as in claim 2, wherein between said pumping device and said first distributor valve a first valve is interposed configured to prevent a reflux of the working fluid toward said pumping device.

5. The device as in claim 1, wherein said hydraulic motor is connected to said maximum pressure valve by means of a first pipe.

6. The device as in claim 5, wherein the second pipe connects the pressure energy accumulation means and the first pipe with each other, wherein in the second pipe a second valve is interposed configured to prevent a reflux of the working fluid toward said hydraulic motor and said maximum pressure valve.

7. The device as in claim 1, further comprising a controller to control at least intervention of the motorized drive device on the maximum pressure valve.

8. The device as in claim 7, wherein at least a pressure detector is connected to the hydraulic motor to assess its working pressure and to said controller.

9. The device as in claim 1, wherein said hydraulic motor is connected to said pressure energy accumulation means by means of a second pipe.

10. The device as in claim 1, wherein said motorized drive device comprises an electric motor.

11. The stretching machine comprising a safety device as in claim 1.

12. A method to control a safety device for a stretching machine, comprising at least a first step with the machine stopped in which at least one capstan is kept blocked in its rotation due to the action of a negative brake, and a second working step during which a pumping device puts a working fluid under pressure to de-activate the negative brake and allow the rotation of the capstan, and a maximum pressure valve regulates a working pressure of a hydraulic motor to control the twisting torque applied to the capstan, wherein during the second working step, and in a breakdown condition at least of the pumping device, the safety device further provides to keep the negative brake de-activated by the action of a pressure of the working fluid, and a motorized drive device connected to the maximum pressure valve controls said working pressure of the hydraulic motor.

13. The control method as in claim 12, wherein during the second working step the pumping device and the hydraulic motor feed the working fluid under pressure to pressure energy accumulation means.

14. The control method as in claim 13, wherein in the breakdown condition at least of the pumping device the pressure energy accumulation means feed the working fluid under pressure to the negative brake to keep the negative brake de-activated.

15. The control method as in claim 12, wherein a controller is suitable to control the action of the motorized drive device even in a breakdown condition at least of the pumping device.

* * * * *